June 5, 1934.  J. A. MARTOCELLO, SR  1,961,889
ICE MANUFACTURING SYSTEM
Filed June 20, 1931   2 Sheets-Sheet 1
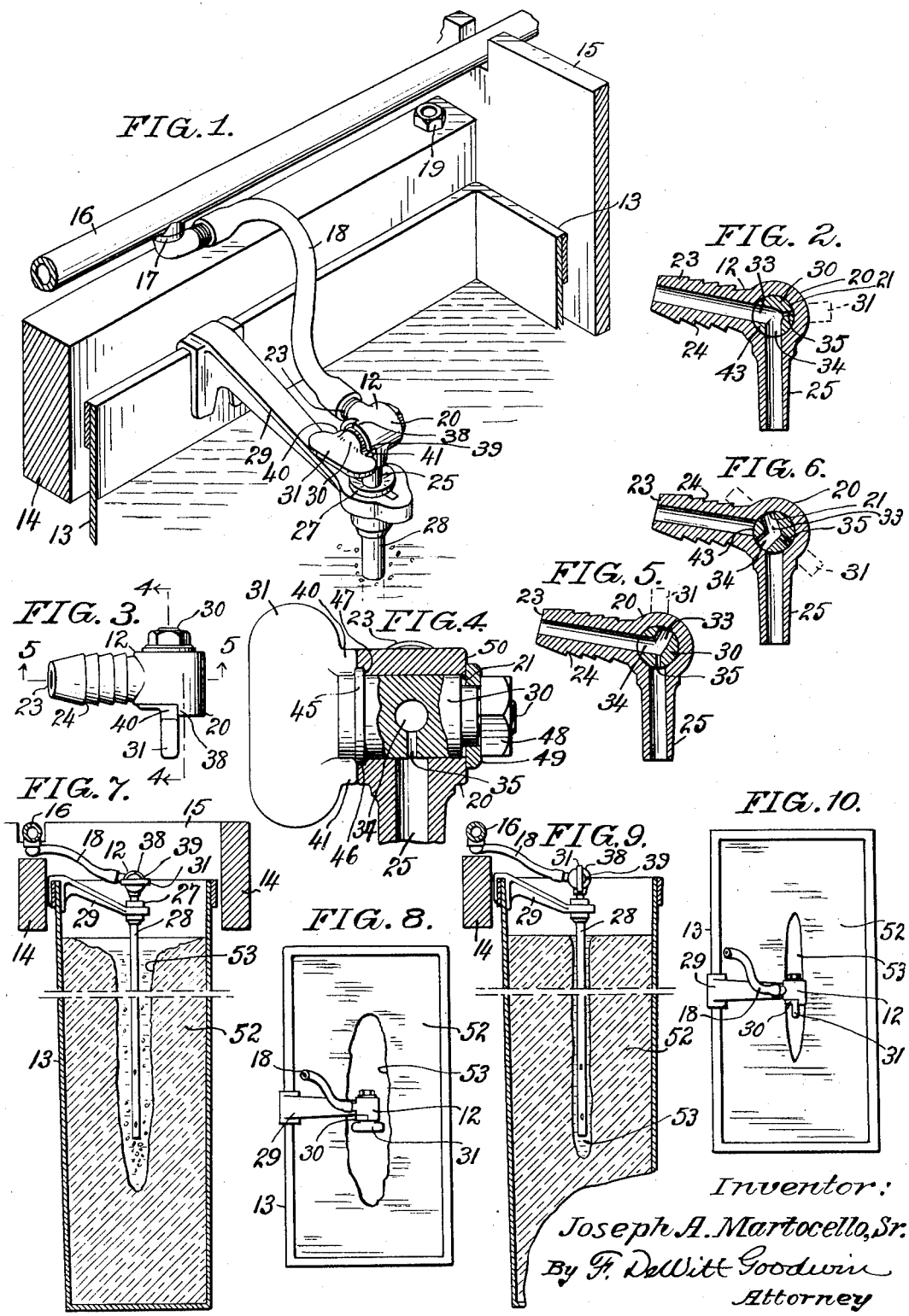
Inventor:
Joseph A. Martocello, Sr.
By F. DeWitt Goodwin
Attorney

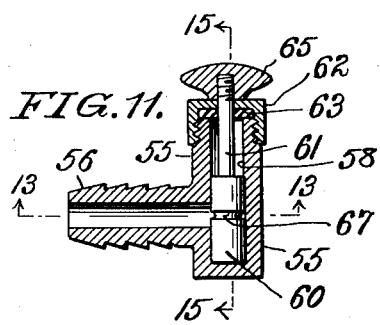
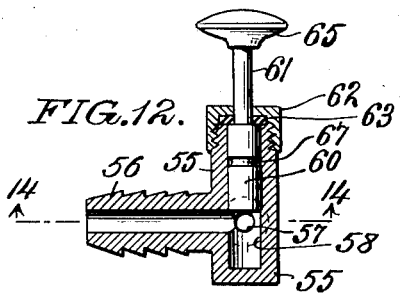
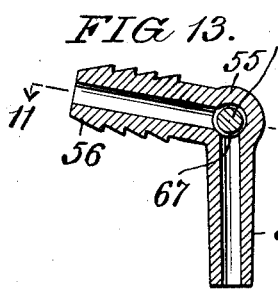
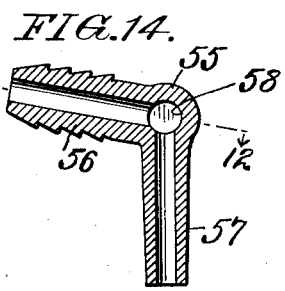
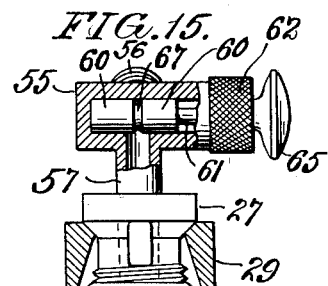
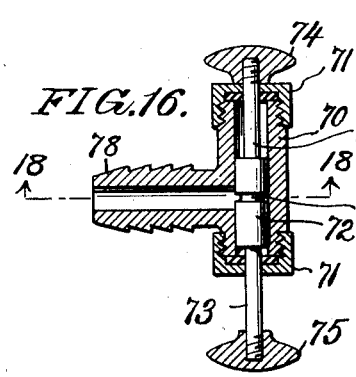
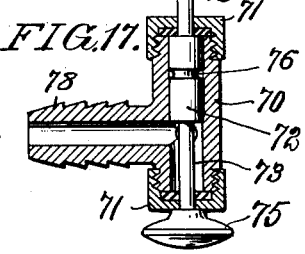
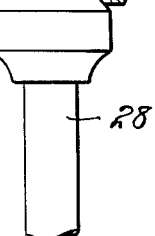
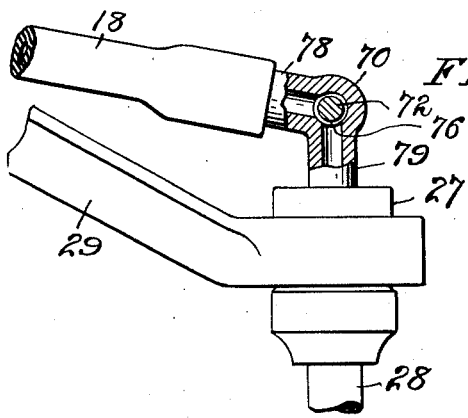

Patented June 5, 1934

1,961,889

UNITED STATES PATENT OFFICE 1,961,889

ICE MANUFACTURING SYSTEM

Joseph A. Martocello, Sr., Philadelphia, Pa.

Application June 20, 1931, Serial No. 545,650

6 Claims. (Cl. 62—172)

My invention relates to improvements in ice manufacturing systems in which clear ice is obtained by using raw water and agitating the water by introducing air under pressure to the cans containing the water during the freezing operation.

My invention particularly relates to the novel method and apparatus for separately controlling the air supply for the individual cans, whereby the agitation of the water may be better controlled and a better quality of ice produced free from ragged edges at the top of the block of ice.

A further object is to provide a novel method by which the freezing time of ice is reduced, in which the volume of air is reduced proportionately to the reduced volume of water when the block of ice is partially formed. The air being warm, due to compression, retards the freezing time, and it has been found that the volume of air suitable for agitating a full can of water will have a tendency to over heat a smaller quantity of water, thus prolonging the time for completing the freezing of the block of ice. By reducing the volume of air, less heat is injected into the water and the freezing time is considerably reduced.

A further object of my invention is to embody an air control valve for each individual can.

A further object is to locate an air control valve adjacent to each can so that it may be readily connected with the drop tube, which directs the air into the can, or the partially frozen block of ice, and the valve may be operated when it is being attached to the drop tube.

A further object is to embody a valve in the elbow nozzle through which air under pressure is directed to the cans.

A further object is to incorporate a valve with an elbow nozzle having a shank constructed for the attachment of a rubber hose, and with an outlet shank usually of tapered form, positioned at approximately right angles to the first mentioned shank, for detachably connecting the elbow to a drop tube fitting, such as is now in general use.

A further object is to provide a valve having a movable valve stem arranged for controlling two volumes of air through the valve.

A further object is to provide a novel valve having a valve stem with apertures of different sizes; which stem may be readily turned to a full open position, or to a reduced supply position, or to a closed position.

A further object is to provide a valve having a sliding valve stem with an annular groove formed in the surface thereof forming the restricted passageway through the valve.

A further object is to provide a form of valve having a sliding valve stem, which may be operated by pushing or pulling a handle.

A further object is to provide a form of valve having a sliding valve stem with two handles, which may be operated by pushing the handles successively.

These together with various other novel features of construction and arrangements of the parts, which will be more fully hereinafter described and claimed constitute my invention.

Referring to the accompanying drawings, Fig. 1 is a perspective view of a portion of an ice can and the supporting structure of a freezing tank, showing my novel valve for controlling the air supply to the can.

Fig. 2 is a vertical section of the valve, shown in Fig. 1, with the valve stem in the open position.

Fig. 3 is a plan view of the valve showing the handle in the stop position for reducing the size of the passage through the valve.

Fig. 4 is an enlarged vertical sectional view, as on line 4—4, Fig. 3.

Fig. 5 is a vertical central sectional view, as on line 5—5, Fig. 3.

Fig. 6 is a view similar to Fig. 5, showing the valve stem turned to a position to close the valve.

Fig. 7 is a vertical sectional view of the can showing the valve and the method of controlling the air supplied to the core formed in the block of ice within the can.

Fig. 8 is a plan view of the can and the valve showing the core in the block of ice, as in Fig. 7.

Fig. 9 is a view similar to Fig. 7 showing a later stage in the freezing process in which the size of the core is reduced.

Fig. 10 is a plan view of the can showing the core in the block of ice, as in Fig. 9.

Fig. 11 is a horizontal sectional view of a modified form of my valve having a sliding valve stem, as on line 11—11, Fig. 13.

Fig. 12 is a view similar to Fig. 11, showing the valve stem in the open position.

Figs. 13 and 14 are vertical sectional views, as on line 13—13, line 14—14, Figs. 11 and 12, respectively.

Fig. 15 is a vertical sectional view as on line 15—15, Fig. 11, and showing the valve connected with an air outlet drop tube.

Fig. 16 is a horizontal sectional view of a different form of valve having two push handles for operating the same.

Fig. 17 is a view similar to Fig. 16, showing the valve in the open position.

Fig. 18 is a vertical sectional view, on line 18—18, Fig. 16 showing the valve connected with a flexible supply pipe and a drop tube.

In the accompanying drawings in which like reference characters refer to like parts, Figs. 1 to 10 illustrate one form of my improved valve 12 which is constructed in such a form that it will take the place of the elbow nozzle heretofore used for connecting the flexible hose with the drop tube for supplying air to the can in which the block of ice is formed.

Fig. 1 illustrates an individual ice can 13 which is supported between the timbers 14 and 15 forming the upper structure of the freezing tank, in a manner well known in the art. An air supply pipe 16 is mounted upon the timbers 15, and is provided with an outlet fitting 17 for the attachment of a flexible hose 18, having its opposite end connected with the valve 12. An air check 19 of the usual form is mounted upon the timber 14 for holding the valve 12 when it is removed from the can.

The valve 12 consists of a body 20 of hollow construction forming a bore 21. Said body 20 is provided with a tubular inlet shank 23 having annular ribs or corrugations 24 formed thereon for the attachment of the flexible air hose 18. The valve body 20 is also provided with a tubular outlet shank 25, preferable of conical or tapered form, positioned at approximately right angles to the length of the inlet shank 23, so that the outlet shank may be detachably connected with the ferrule 27, which is provided with a conical, or tapered, recess to receive the shank 25. Said ferrule may be provided with a rubber or leather bushing, not shown in the drawings, surrounding said recess, in which case the outlet shank 25 may be of cylindrical form.

The ferrule 27 carries the air outlet or drop tube 28, through which the air is conveyed to the central portion of the can 13. The ferrule 27 is supported upon a bracket 29 which is detachably mounted upon the top edge of the can 13 in a manner well known in the art.

A valve stem 30 is rotatably mounted in the bore 21 of the body 20. Said stem is provided with a handle 31 for rotating the same.

The valve stem 30 is provided with transverse, or radial ports, or apertures 33, 34, and 35 which communicate at the center of the stem. The large ports 33 and 34 are positioned at approximately right angles to each other and form an unrestricted passageway through the stem from the inlet shank 23 to the outlet shank 25, when the handle 31 and the stem 30 are positioned as shown in Figs. 1 and 2, with the aperture 33 registering with the opening through the inlet shank 23 and the aperture 34 registering with the opening through the outlet shank 25, for supplying a large quantity of air to the can 13.

The aperture 35 formed in the stem 30 is relatively smaller than the apertures 33 and 34, and forms a restricted passageway through the stem when the handle and stem are in the position shown in Figs. 3, 4, and 5, for allowing only a small quantity of air to pass from the inlet shank 23 through the ports 34 and 35 and the outlet shank 25.

Stops, or shoulders 38 and 39 are provided upon the valve body 20 against which the lugs 40 and 41 of the stem or handle 31 take when the stem is turned to the positions shown in Figs. 2 or 5. When the handle and stem are turned to an intermediate position, as shown in Fig. 6, the solid portion 43 of the stem closes the passageway from the inlet shank 23 and forms a shut-off valve.

The valve stem 30 and the bore 21 of the body 20 are of cylindrical formation, arranged for forming an air tight valve which will rotate freely without binding.

The stem 30 is provided with an annular collar 45 and the body 20 is provided with an annular recess 46; see Fig. 4, to receive the collar. A transverse facing surface 47 is formed upon the body 20 against which the collar 45 is tightly held by a nut 48 and a washer 49 located at the opposite end of the stem from the collar 45.

The body 20 has a facing surface 50 against which the washer 49 is clamped by the nut for preventing leakage around the stem.

Figs. 7 to 10 illustrate the process of freezing the water in the cans 13, and my improved method of controlling the air which is admitted to the can through my improved valve for agitating the water.

Air under pressure is supplied to the water in the can 13, through the drop tube 28 for agitating the water for the purpose of forming a clear block of ice and eliminating the objectionable hole or core, at the center of the block. Fig. 7 shows a block of ice 52 partially formed with a hole or core 53, having ragged edges formed around the top of the block, caused by admitting too much air to the water after the block of ice is partially formed, as shown in Figs. 7 and 8.

In manufacturing ice it is desirable to admit a large quantity of air for agitating the water when starting to freeze the water to form the block of ice and it is desirable to reduce the volume of air when the hole or core 53 in the block has been reduced to the proportions shown in Figs. 7 and 8.

At this stage the core water is pumped from the hole or core 53, and fresh water is inserted, so that the top end of the block of ice will be level when frozen, as shown in Fig. 9. When the core has been refilled with water it is desirable to reduce the quantity of air, and my novel form of valve is provided for readily reducing the volume of air which is supplied through the drop tube 28 to the core 53 of the block of ice, by turning the handle 31 to a vertical position for reducing the volume of air.

By providing an air controlling valve 20 in each air outlet pipe 28 leading to the individual cans, a better control of the air is possible, and by this method a block of ice can be formed which is clear, or transparent, to a greater degree than has heretofore been accomplished, and the freezing time is greatly reduced.

The modified form of my improved valve, shown in Figs. 11 to 15, consists of a body portion 55 having an inlet shank 56 and an outlet shank 57 formed thereon. The body 55 has a cylindrical bore 58 extending at right angles to the longitudinal axes of the shanks. Said shanks are of tubular formation and form passageways which communicate with each other through the bore formed in the body. The inlet shank 56 is provided with annular corrugations for connecting the same with a flexible hose 18, and the outlet shank 57 is preferable of conical, or tapered, formation so that it may be readily connected with a ferrule 27 having an inlet opening at the upper end for the reception of the outlet shank 57 of the valve, as shown in Fig. 15. The ferrule 27 carries the usual form of drop tube 28 for conveying the air to the center of the can or to the center of the block of ice when the block is partially frozen. The ferrule is supported by a bracket 29, mounted upon the can in a manner similar to that shown in Fig. 1 and above described.

A cylindrical valve stem 60 is slidably mounted in the cylindrical bore 58 of the valve, shown in Figs. 11 to 15. The stem 60 is provided with a valve rod 61 extending without the valve through a cap 62, which is in threaded engagement with the end of the valve body 55. A resilient washer or packing 63 is secured between the cap and the body and is provided with a central aperture through which the rod 61 passes.

A handle 65 is secured upon the outer end of the rod 61 for operating the stem. The stem 60 is provided with an annular groove 67, which forms a restricted passageway of smaller area, relatively to the area of the inlet passageway through the inlet shank 56. When the valve stem 60 is in the position shown in Fig. 11, a small quantity of air may pass through the groove 67 of the stem from the inlet shank to the outlet shank. When the stem 60 is moved to the open position shown in Fig. 12, by withdrawing the handle, as shown, the inner end, or face, of the stem will be positioned to entirely open the passageway through the bore of the body and from an unobstructed passageway between the inlet and outlet shanks, as shown in Fig. 14. When the stem 60 is moved to an intermediate position it will completely close the passageway through the valve.

Figs. 16 to 18 illustrate a form of valve having a double end body 70, having caps 71 and a stem 72 which is provided with two valve rods 73 and handles 74 and 75. The rods 73 extend in opposite directions through the caps 71 mounted upon the valve body. The stem 72 is provided with an annular groove 76 forming a restricted passageway through the body when the stem is in the position shown in Fig. 16, into which it has been moved by pushing the handle 74 inwardly.

Fig. 17 shows the stem in the open position into which it has been moved by pushing upon the handle 75. By providing two handles 74 and 75, the valve may be opened or closed by pushing upon the opposite handles. The valve body 70 is incorporated with the inlet and outlet shanks 78 and 79 for the attachment of the flexible air pipe 18 and for the attachment of the valve to the drop tube 28, as shown in Fig. 18.

In the forms shown in Figs. 11 to 18, the valve body is somewhat longer in one direction than the other so that the operator may readily determine which is the full open position of the valve, and which is the restricted position, as the longer end of the body is provided to receive the stem when it is moved to a position to fully open the valve. By this irregular construction of the valve body any confusion is eliminated as to which is the open position of the valve.

The operation of my invention is as follows: my novel valve is used in place of the elbow nozzle heretofore employed as a connecting fitting between the flexible hose 18 and the ferrule 21. The valve is incorporated with the inlet and outlet shanks which are similar in construction to the shanks of the elbow nozzles heretofore used.

My improved valve provides means for controlling the supply of air to the individual cans in which the blocks of ice are formed. In the form shown in Figs. 1 to 10, the volume of air may be controlled by turning the handle between the stop positions for the full supply of air when in the position shown in Figs. 1 and 2, and providing for a restricted supply of air when the handle is turned to the position shown in Figs. 3, 4, and 5.

When it is desired to entirely shut off the air, the handle is turned to an intermediate position between the stops so that the valve stem will be in the position shown in Fig. 6, in which the valve completely shuts off the air supply.

The preferable arrangement of the valve is to position the handle horizontally when the valve is fully open, thus assisting the operator in determining the open position of the valve.

The valve shown in Figs. 11 to 15 is operated by pulling the handle outwardly from the body so that the valve stem will be withdrawn out of alignment with the passageway between the inlet and outlet shanks, thus forming an unobstructed passageway through the valve. By pushing the handle toward the body of the valve, the stem will be positioned so that the restricted groove will be in alignment with the inlet and outlet shanks and allow a relatively small volume of air to pass through the valve.

In the forms shown in Figs. 16 to 18, the valve is provided with two handles for operating the stem. By pushing the handle 75 toward the valve body, as shown in Fig. 17, an unobstructed passageway will be formed through the body between the inlet and outlet shanks 78 and 79. By pushing the handle 74 toward the valve body, the stem will be positioned with the groove 76 in alignment with the inlet shank 78 and allow only a reduced volume of air to pass through the valve.

Figs. 15 and 18 illustrate how the valve shown in Figs. 11 to 18 may be connected between the flexible air hose 18 and the ferrule 27 located at the top of the drop tube 28 making the valve readily accessible so that it can be operated when it is being inserted or removed from the ferrule 27.

When the valve is removed from the ferrule 27, the tapered outlet shank may be inserted into the conical recess formed in the air check fitting 19, shown in Fig. 1, which is mounted upon the tank structure. When the valve is removed from the ferrule and placed in the air check fitting 19, the loss of air pressure is avoided by first operating the handle to the closed position. The can 13 together with the block of ice 52 may then be removed from the freezing tank in the usual manner.

My novel form of valve is of great advantage in ice plants in which the cans and blocks of ice are handled individually, and my invention provides means for individually controlling the supply of air to the separate can and provides a method by which a more perfect block of ice can be formed than by the methods previously employed, and the time for freezing is greatly reduced by reducing the volume of the relatively warm air when the block of ice is partly formed and the volume of water is thereby reduced.

Various changes in the construction and arrangement of the parts may be made without departing from my invention.

I claim:

1. In the manufacture of blocks of ice in cans containing water agitated by air supplied under pressure, the method which consists in supplying a relatively large predetermined volume of air to the cans until the sides and bottom of the blocks are formed and a core hole is formed in the upper portion of each block, controlling the volume of air supplied to the water in the core holes formed in the blocks by a separate operation controlled manually, and continuing to supply a predetermined relatively smaller volume of air to said core holes until the blocks are completely formed.

2. In the manufacture of blocks of ice in cans containing water agitated by air supplied under pressure, the method which consists in supplying a relatively large volume of air to the cans until the sides and bottom of the blocks are formed and a core hole is formed in the upper portion of each block, manually controlling the volume of air supplied to the water in said core holes by a separate operation associated with each can, and continuing to supply a predetermined reduced volume of air to the core hole of each block after the sides and bottom of the block is formed and until the block is completely formed.

3. In the manufacture of blocks of ice in cans containing water agitated by a large volume of air supplied under pressure through a drop tube in each can, the method of controlling the supply of air by an operation associated with each drop tube which includes supplying the larger volume of air through said tube until the sides and bottom of the block are formed and a core hole is formed in the upper portion of the block, and then supplying a relatively smaller volume of air through the tube to the core hole until the block is completely formed.

4. In a circulating system for ice manufacturing plants, an ice can, an air supply pipe located adjacent to the can, an air tube located within the can, a flexible pipe, a valve body, said flexible pipe and said valve body connected to form a passage between the supply pipe and said tube, a valve stem movably mounted within said body and adjustable to two different fixed positions and arranged for controlling the passage of a predetermined volume of air to said tube when said stem is in one of said adjusted positions and for controlling a relatively smaller predetermined volume of air to said tube when said stem is in the other of said adjusted positions.

5. In a circulating system for ice manufacturing plants, an ice can, an air supply pipe located adjacent to the can, an air tube located within the can, a valve body having an inlet shank, a flexible pipe connected between the supply pipe and said shank, an outlet shank upon the valve body connected with said tube, a valve stem rotatably mounted within the valve body, means upon said body and said stem forming stops arranged to limit the movements of the stem within the body to two adjusted positions, said stem having a large aperture formed through the same arranged for the passage of a predetermined volume of air to said tube when the stem is in one of said adjusted positions, and said stem having a restricted aperture formed through the same for the passage of a reduced volume of air to said tube when the stem is in the other one of said adjusted positions.

6. In a circulating system for ice manufacturing plants, an ice can, an air supply pipe located adjacent to the can, an air tube located within the can, a flexible pipe, a valve body, said flexible pipe and said valve body connected to form a passage between the supply pipe and said tube, a valve stem slidably mounted within said body and adjustable to two different fixed positions and arranged for controlling the passage of a predetermined volume of air to said tube when said stem is in one of said adjusted positions and for controlling a relatively smaller predetermined volume of air to said tube when said stem is in the other of said adjusted positions.

JOSEPH A. MARTOCELLO, Sr.